United States Patent
Lambert et al.

(10) Patent No.: US 10,137,520 B2
(45) Date of Patent: Nov. 27, 2018

(54) INITIATION OF WELDING ARC BY RESTRICTING OUTPUT

(71) Applicant: Victor Equipment Company, Chesterfield, MO (US)

(72) Inventors: Roger H. Lambert, West Lebanon, NH (US); Geoffrey H. Putnam, Topsham, VT (US)

(73) Assignee: Thermal Dynamics Corporation, West Lebanon, NH (US)

(*) Notice: Subject to any disclaimer, the term of this patent is extended or adjusted under 35 U.S.C. 154(b) by 0 days.

(21) Appl. No.: 15/840,368

(22) Filed: Dec. 13, 2017

(65) Prior Publication Data

US 2018/0111215 A1    Apr. 26, 2018

Related U.S. Application Data

(63) Continuation of application No. 13/480,663, filed on May 25, 2012, now Pat. No. 9,868,171.

(60) Provisional application No. 61/490,329, filed on May 26, 2011, provisional application No. 61/547,668, filed on Oct. 14, 2011.

(51) Int. Cl.
  *B23K 9/09* (2006.01)
  *B23K 9/10* (2006.01)
  *B23K 9/067* (2006.01)
  *B23K 9/073* (2006.01)

(52) U.S. Cl.
  CPC .......... *B23K 9/0673* (2013.01); *B23K 9/073* (2013.01); *B23K 9/09* (2013.01); *B23K 9/10* (2013.01)

(58) Field of Classification Search
  CPC ... H05B 1/00; H05B 3/00; H05B 7/00; B23K 9/00; B23K 9/0007; B23K 11/10; B23K 9/09; B23K 9/10
  USPC ....... 219/50, 54, 91.1, 69.13, 69.18, 137 PS, 219/136, 137.7, 137.71
  See application file for complete search history.

(56) References Cited

U.S. PATENT DOCUMENTS

| | | | |
|---|---|---|---|
| 3,509,314 A | 4/1970 | Freytag | |
| 3,906,184 A * | 9/1975 | Gibbs | B23K 9/0732 219/130.21 |
| 3,950,759 A | 4/1976 | Ziegenfuss | |
| 4,000,374 A | 12/1976 | De Keyser | |

(Continued)

FOREIGN PATENT DOCUMENTS

| | | |
|---|---|---|
| CN | 1851998 A | 10/2006 |
| CN | 1866719 A | 11/2006 |

(Continued)

OTHER PUBLICATIONS

Search Report for PCT/US2012/039563 dated Sep. 28, 2012.

(Continued)

*Primary Examiner* — Michael Laflame, Jr.

(74) *Attorney, Agent, or Firm* — Edell, Shapiro & Finnan, LLC

(57) ABSTRACT

Systems and methods for providing an improved start in a welding process are provided. The system may include a power circuit and a control circuit. The power circuit can generate a welding output power. The control circuit may be in communication with the power circuit to control, during the start of the welding process, at least one welding parameter until the control circuit determines that welding energy output exceeds an energy output threshold.

20 Claims, 8 Drawing Sheets

(56) References Cited

U.S. PATENT DOCUMENTS

| | | | |
|---|---|---|---|
| 4,153,409 A | 5/1979 | Capps et al. | |
| 4,300,035 A | 11/1981 | Johansson | |
| 4,300,036 A | 11/1981 | Johansson | |
| 4,319,124 A | 3/1982 | Johansson | |
| 4,403,135 A | 9/1983 | Moyer et al. | |
| 4,447,700 A | 5/1984 | Cohen | |
| 4,450,340 A | 5/1984 | Corrigall et al. | |
| 4,734,556 A * | 3/1988 | Namiki | B23K 11/252 219/110 |
| 4,746,051 A | 5/1988 | Peter | |
| 5,045,670 A | 9/1991 | Gilliland | |
| 5,136,139 A | 8/1992 | Gilliland | |
| 5,221,825 A | 6/1993 | Siewert et al. | |
| 5,223,683 A | 6/1993 | Ishizaka | |
| 5,233,158 A | 8/1993 | Karakama et al. | |
| 5,270,516 A | 12/1993 | Hamamoto et al. | |
| 5,938,945 A | 8/1999 | Hofmann et al. | |
| 6,087,627 A | 7/2000 | Kramer | |
| 6,207,928 B1 | 3/2001 | Kawamoto et al. | |
| 6,236,017 B1 | 5/2001 | Smartt et al. | |
| 6,335,511 B1 | 1/2002 | Rothermel | |
| 6,344,627 B1 | 2/2002 | Yonemori et al. | |
| 6,441,342 B1 | 8/2002 | Hsu | |
| 6,642,483 B1 | 11/2003 | Koga et al. | |
| 6,791,063 B2 | 9/2004 | Manthe | |
| 6,815,640 B1 | 11/2004 | Spear et al. | |
| 7,005,610 B2 | 2/2006 | Ihde et al. | |
| 7,041,937 B2 | 5/2006 | Ihde et al. | |
| 9,314,866 B2 | 4/2016 | Lambert et al. | |
| 2002/0117489 A1 | 8/2002 | Arndt et al. | |
| 2003/0222054 A1 | 12/2003 | Katou et al. | |
| 2004/0069752 A1 | 4/2004 | Ulrich et al. | |
| 2004/0079740 A1 | 4/2004 | Myers et al. | |
| 2004/0099649 A1 | 5/2004 | DeCoster | |
| 2004/0173591 A1 | 9/2004 | Knoener | |
| 2004/0188405 A1 * | 9/2004 | Holverson | B23K 9/067 219/130.51 |
| 2004/0222195 A1 * | 11/2004 | Boccadoro | B23H 1/022 219/69.13 |
| 2005/0016974 A1 | 1/2005 | Myers et al. | |
| 2005/0045611 A1 | 3/2005 | Ihde et al. | |
| 2005/0199605 A1 | 9/2005 | Furman et al. | |
| 2005/0258156 A1 | 11/2005 | Rice et al. | |
| 2006/0000812 A1 | 1/2006 | Weber et al. | |
| 2006/0016792 A1 | 1/2006 | Uecker et al. | |
| 2006/0076332 A1 | 4/2006 | Matus et al. | |
| 2006/0108343 A1 | 5/2006 | Schwartz | |
| 2006/0131291 A1 | 6/2006 | Kaufman et al. | |
| 2006/0163229 A1 | 7/2006 | Hutchison et al. | |
| 2006/0196862 A1 | 9/2006 | Sickels | |
| 2006/0196865 A1 | 9/2006 | Weiss | |
| 2006/0213892 A1 | 9/2006 | Ott | |
| 2007/0164007 A1 | 7/2007 | Peters et al. | |
| 2007/0181547 A1 | 8/2007 | Vogel et al. | |
| 2007/0181553 A1 | 8/2007 | Stanzel et al. | |
| 2007/0251932 A1 | 11/2007 | Vogel et al. | |
| 2007/0262065 A1 | 11/2007 | Peters et al. | |
| 2008/0006612 A1 | 1/2008 | Peters et al. | |
| 2008/0011728 A1 | 1/2008 | Peters et al. | |
| 2008/0017621 A1 | 1/2008 | Uecker | |
| 2008/0078811 A1 | 4/2008 | Hillen et al. | |
| 2008/0078812 A1 | 4/2008 | Peters et al. | |
| 2008/0149610 A1 | 6/2008 | Huismann et al. | |
| 2008/0156782 A1 | 7/2008 | Rice et al. | |
| 2008/0203065 A1 | 8/2008 | Feldhausen et al. | |
| 2008/0264915 A1 | 10/2008 | Manthe et al. | |
| 2009/0008374 A1 | 1/2009 | Fosbinder | |
| 2009/0032513 A1 * | 2/2009 | Nishisaka | B23K 9/0956 219/130.1 |
| 2009/0112343 A1 | 4/2009 | Yuan et al. | |
| 2009/0139971 A1 | 6/2009 | Huismann et al. | |
| 2009/0152251 A1 | 6/2009 | Dantinne et al. | |
| 2009/0184098 A1 | 7/2009 | Daniel et al. | |
| 2009/0277893 A1 | 11/2009 | Speilman | |
| 2010/0018954 A1 | 1/2010 | Hussary et al. | |
| 2010/0065540 A1 | 3/2010 | Ihara et al. | |
| 2010/0108654 A1 | 5/2010 | Ulrich et al. | |
| 2010/0126976 A1 | 5/2010 | Kawamoto et al. | |
| 2010/0200553 A1 | 8/2010 | Yamazaki et al. | |
| 2010/0230394 A1 | 9/2010 | Yokota et al. | |
| 2010/0237052 A1 | 9/2010 | Daniel et al. | |
| 2010/0276406 A1 | 11/2010 | Silk et al. | |
| 2010/0288734 A1 | 11/2010 | Dave et al. | |
| 2010/0301029 A1 | 12/2010 | Meckler et al. | |
| 2010/0308026 A1 | 12/2010 | Vogel | |
| 2010/0308027 A1 | 12/2010 | Vogel | |
| 2010/0314371 A1 | 12/2010 | Davidson et al. | |
| 2011/0017718 A1 | 1/2011 | Kazmaier et al. | |
| 2011/0108536 A1 | 5/2011 | Inada et al. | |
| 2011/0155710 A1 | 6/2011 | Farah et al. | |
| 2011/0204034 A1 | 8/2011 | Schartner et al. | |
| 2011/0309053 A1 | 12/2011 | Baus | |
| 2012/0298641 A1 | 11/2012 | Lambert et al. | |
| 2012/0298643 A1 | 11/2012 | Lambert et al. | |
| 2012/0298644 A1 | 11/2012 | Lambert et al. | |

FOREIGN PATENT DOCUMENTS

| | | |
|---|---|---|
| CN | 101125389 A | 2/2008 |
| CN | 101217255 A | 7/2008 |
| CN | 101686016 A | 3/2010 |
| DE | 3523879 | 1/1987 |
| EP | 2163337 | 3/2010 |
| JP | S6171178 | 4/1986 |
| JP | 63299862 | 12/1988 |
| JP | 2001298994 | 4/2000 |
| JP | 2003071564 | 3/2003 |
| JP | 2006116561 | 5/2006 |
| JP | 2008307569 | 12/2008 |
| WO | 2011106175 | 9/2011 |

OTHER PUBLICATIONS

Ex Parte Gary M. Katz, Appeal 2010-006083, U.S. Appl. No. 09/828,122, dated Mar. 29, 2011.
Search Report for PCT/2012/039516 dated Sep. 28, 2012.
Search Report for PCT/US2012/039552 dated Sep. 28, 2012.
Notification of Transmittal of International Search Report and Written Opinion of International Searching Authority, for PCT/US2012/039520 dated Mar. 3, 2013.

* cited by examiner

INITIATION OF WELDING ARC BY RESTRICTING OUTPUT

CROSS REFERENCE TO RELATED APPLICATIONS

This application is a continuation of pending prior U.S. Non-Provisional patent application Ser. No. 13/480,663 filed on May 25, 2012, which claims the benefit of U.S. Provisional Patent Application No. 61/490,329 filed May 26, 2011, and U.S. Provisional Patent Application No. 61/547,668 filed Oct. 14, 2011, the contents of which are hereby incorporated by reference in their entireties.

BACKGROUND

The present application generally relates to improving arc characteristics of a welder.

SUMMARY

Welding systems can experience erratic operation during the start of the welding process due to temperatures of the weldment and filler wire not having yet stabilized. Additionally, welding systems can exhibit repeated stubbing, which manifests as a series of violent contacts of an electrode and work piece. The stubbing can be audible and may be telegraphed through the Metal Inert Gas (MIG) welding gun to the user's hand. The stubbing prolongs and impedes initiation of the weld, making optimal steady-state settings difficult to establish. Welding systems encountering these problems may not provide for optimal welds.

The present disclosure discusses optimizing starting characteristics by providing, at the start of the welding process, a controlled current pulse that is based on output voltage and run in settings, for example. Additionally, the present disclosure discusses optimizing starting characteristics and preventing stubbing by optimizing at the start of the welding process, output voltage, wire feed, and inductance, for example.

A system for providing an improved start in a welding process is provided. In one implementation, a power circuit generates welding output power for a welding process. A control circuit may be in communication with the power circuit to control the start of the welding process. The control circuit may be configured to receive a selection of a run in setting or voltage setting, and provide a current pulse at a start of the welding process for a period of time. The current pulse may have a peak magnitude that is based on the run in setting or voltage setting, or the period of time may be a predefined period of time that is based on the run in setting.

In another implementation, the power circuit generates welding output power. The control circuit may be in communication with the power circuit to control, during the start of the welding process, at least one welding parameter until the control circuit determines that welding energy output exceeds an energy output threshold or a time that the welding output power is provided exceeds a time threshold.

A method for generating a weld during a start of a welding process is also provided. The method includes generating, by a power circuit, welding output power. The method includes continuously determining, by a control circuit in communication with the power circuit, a welding energy output or a time that the welding output power is provided. The method includes controlling, by the control circuit during the start of the welding process, a welding parameter until the welding energy output exceeds an energy output threshold or until the time exceeds a time threshold.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

The drawings described herein are for illustration purposes only and are not intended to limit the scope of the present disclosure in any way.

FIG. 2b is a front view of an interface on the housing of FIG. 2a;

It should be understood that throughout the drawings, corresponding reference numerals indicate like or corresponding parts and features.

DETAILED DESCRIPTION

The term "substantially" used herein with reference to a quantity or mathematical relationship includes (1) a variation in the recited quantity or relationship of an amount that is insubstantially different from a recited quantity or relationship for an intended purpose or function, or (2) a variation in the recited quantity or relationship of an amount that produces the same quality.

Figure 1:
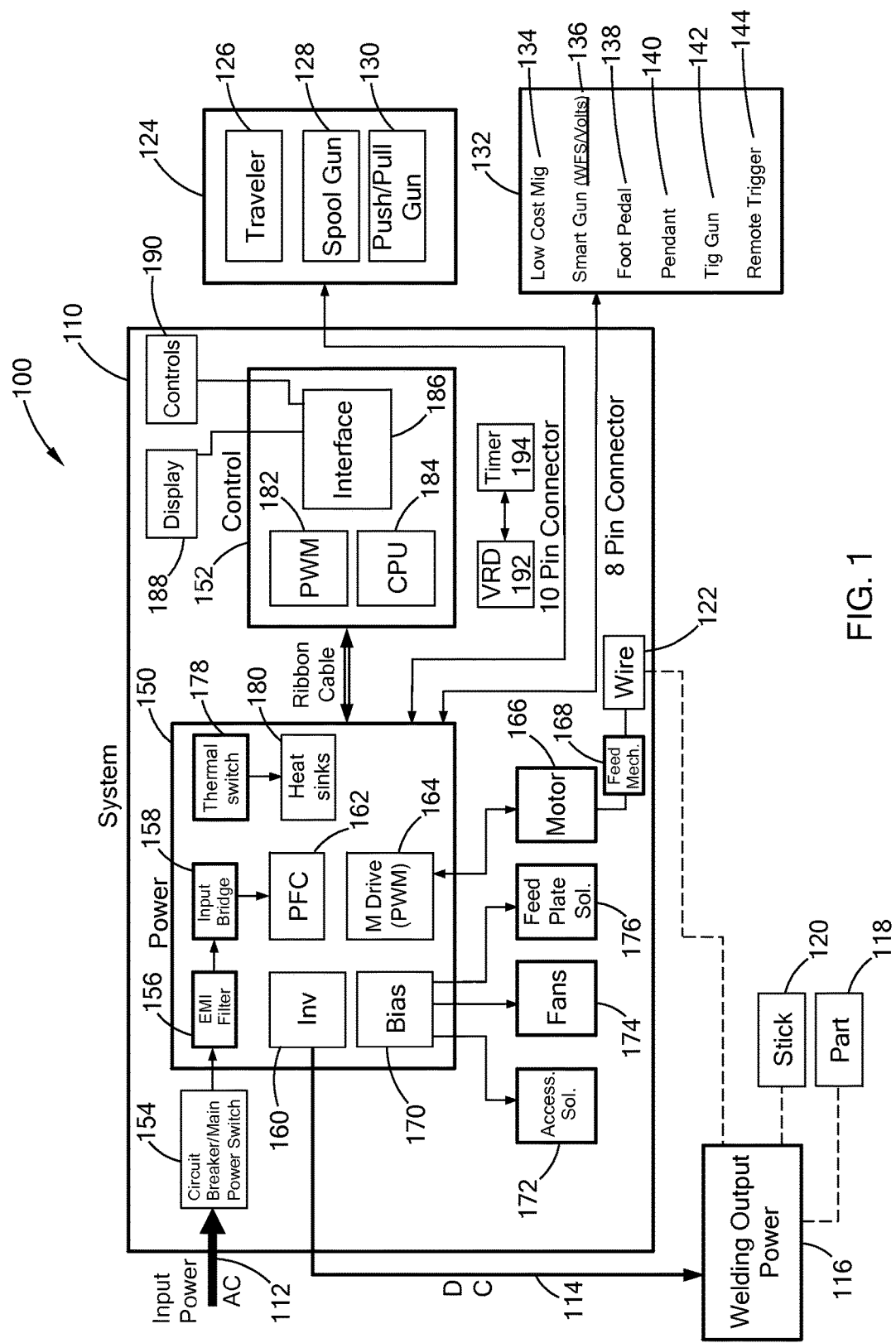
FIG. 1 is a schematic view of a welding system.

Now referring to FIG. 1, a power supply for a welding system 100 is provided. The power supply 110 receives input power 112 which may be an alternating current power line, for example a 220 volt AC power line. However, it is understood that the power supply 110 may be adaptable to receive a range of voltages, for example between 187 to 276 volts AC. In addition, it may also be possible to configure the power supply for other voltage ranges depending on the application and required welding output power. The power supply 110 provides a direct current power output voltage 114 that may be used as a welding output power 116. In some implementations, the power supply 110 may be used for stick welding (also known as Shielded Metal Arc Welding or SMAW) or various other welding applications such as MIG (Metal Inert Gas, also known as gas metal arc welding or GMAW), flux core arc welding, TIG (tungsten inert gas welding, also known as Gas Tungsten Arc Welding or GTAW), plasma arc, or other welding processes. Therefore, in one example the current return lead of the welding output power 116 may be provided to a part 118 that is to be welded, and the supply voltage may be provided to an electrode, for example a stick 120 or wire 122. Therefore, as the stick 120 comes in contact with the part 118 an arc may be formed that melts both the base metal and electrode and cooperates to form a weld. In other implementations, the output voltage may be provided through a wire 122 which may be continuously fed to the part to form a continuous weld. In TIG mode the electrode is not melted, and generally only the base metal is melted.

The power supply 110 may control the output voltage and the output current, as well as the feeding of the wire to optimize the welding process. In addition, the power supply 110 may be connected to one group of accessories 124 including for example a remote wire feeder 126, a spool gun 128, or a push/pull gun 130. Further, the power supply 110 may be connected to other groups of accessories 132, for example through an 8-pin connector. The second group of accessories 132 may include a MIG gun 134, a smart gun 136, a foot pedal 138, a pendant 140, a TIG gun 142, and/or a remote control/trigger 144.

Within the power supply 110, the input power 112 may be provided to a circuit breaker or switch 154. Power may be provided from the circuit breaker 154 to a power circuit 150. The power circuit 150 may condition the input power to provide a welding output power 116, as well as, for powering various additional accessories to support the welding process. The power circuit 150 may also be in communication with the control circuit 152. The control circuit 152 may allow the user to control various welding parameters, as well as, providing various control signals to the power circuit 150 to control various aspects of the welding process. The power from the circuit breaker 154 may be provided to an EMI filter 156 of the power circuit 150. Power is provided from the EMI filter 156 to an input bridge 158. Power may be provided from the input bridge 158 to a conditioning circuit 162. The conditioning circuit 162 may include a boost circuit, a transformer, as well as a power factor correction circuit. Power is provided from the conditioning circuit 162 to the inverter 160 where the power is converted to a DC signal 114 thereby providing welding output power 116. Power may also be provided to a bias circuit 170 to power a number of accessories internal or external to the power supply 110 that facilitate operation of the power supply and welding process. For example, the bias circuit 170 may provide power to gas solenoid valves 172, fans 174, as well as, other accessory devices. In addition, power is provided to a motor drive circuit 164 that is in communication with a motor 166. The motor 166 may be in communication with a feed mechanism 168 configured to feed wire 122 to a weld gun for use in creation of the weld. The control circuit 152 may provide control signals to any of the previously mentioned circuits in the power circuit 150 to optimize the weld process and performance of the power supply 110. The control circuit 152 may include a pulse width modulator 182 and a processor 184 for analyzing various weld characteristics and calculating various weld parameters according to user settings, as well as, various feedback signals. In addition, an interface circuit 186 may be provided to control a display 188 that may provide information to the user of the welding system. The display 188 may include an LED display, a LCD display, or various other known display technology. The display may provide various menu choices to the user, as well as, providing various feedback on the welding process including the values of various parameters or graphs of previous welding characteristics. The controls 190 may also be in communication with the interface circuit 186 to allow the user to provide input such as various welding parameters to control the operation of the welding process.

The power supply 110 may further include a voltage reducing device (VRD) circuit 192, a low-power circuit that detects contact between the part 118 to be welded and the electrode. When an open circuit condition is detected between the electrode and the work piece, the VRD circuit 192 may reduce the maximum open circuit voltage to safe levels. When contact is made and/or the load is below a threshold resistance, the VRD circuit 192 may no longer reduce the voltage and thus may allow the welding system 100 to operate at full power. The VRD circuit 192 may be in communication with a timer 194. The timer 194 may be implemented as software as part of the control circuit 152, or may be comprised of an electronic circuit.

Figure 2A:
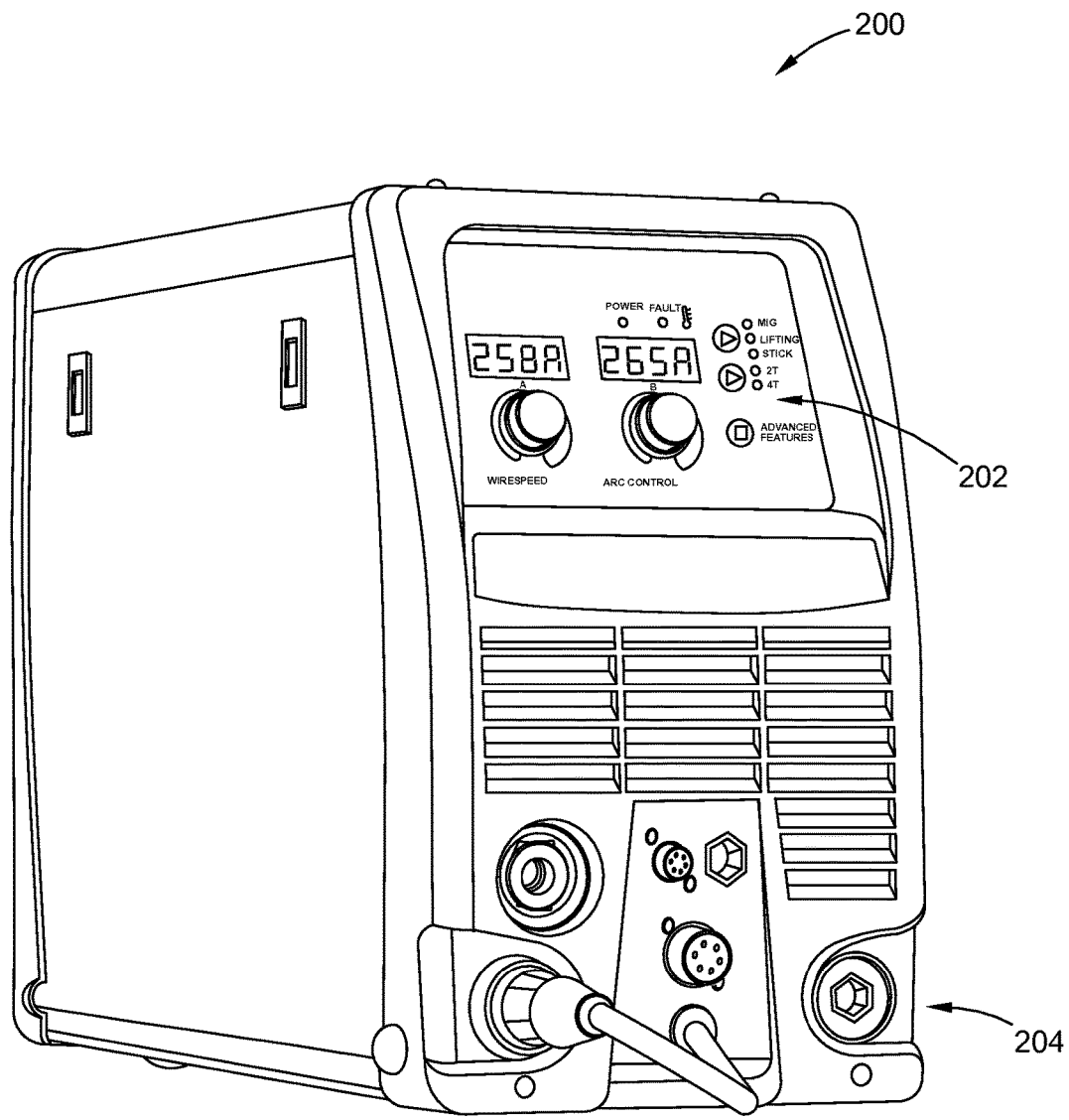
FIG. 2a is a perspective view of a housing which contains the welding system of FIG. 1.

Now referring to FIG. 2a, a housing 200 is provided that may be implemented with the welding system 100. The housing 200 may contain the power supply 110, and may further include a user interface 202 and a front connection panel 204. The front connection panel 204 may, for example, be used for connecting the power supply 110 to the first and second groups of accessories 124 and 132, as discussed above.

Figure 2B:
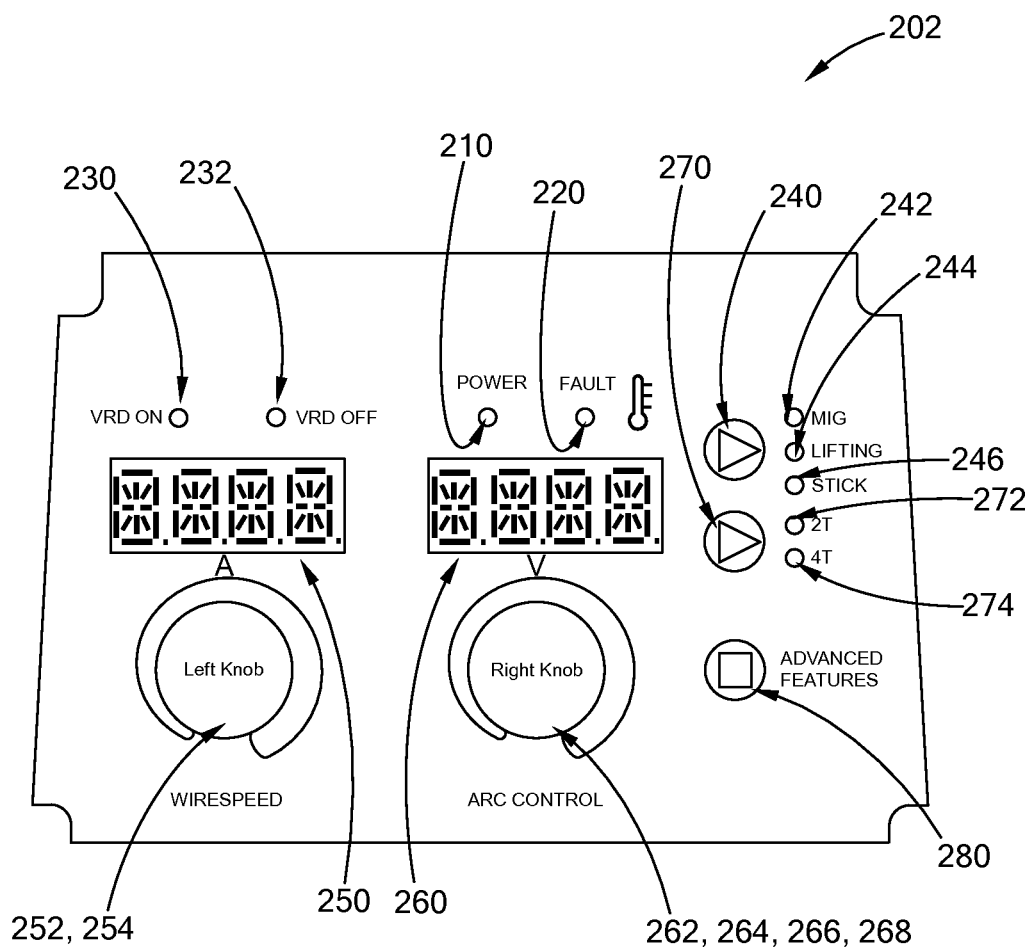

Now referring to FIG. 2b, a particular implementation of a user interface 202 is provided that may include various inputs selectable by a user and various indicators and displays. A power indicator 210 may indicate when the power supply 110 is receiving the input power 112. A fault light 220 may indicate when the welding process has entered a fault condition. A VRD "on" indicator 230 may indicate when the VRD is on, and a VRD "off" indicator 232 may indicate when the VRD is off.

A mode selection input 240 may allow the user to select a desired welding process. The mode selection input 240 may be a button which when pressed causes the power supply 100 to cycle through and select a welding process. Three welding process indicators 242, 244, 246 may respectively light upon selection of, for example, MIG, TIG, or stick welding. The MIG selection provides a suitable configuration for both gas metal arc welding and flux core arc welding.

A trigger interlock input 270 may allow a user to select between 2T and 4T modes for MIG, TIG and stick welds that are activated via an electric switch. The 2T mode allows the user to push and hold the switch to activate and release the switch to deactivate. The 4T mode allows the user to push and release the switch to activate, then push and release the switch again to deactivate. An indicator 272 may light when the 2T mode is selected, and an indicator 274 may light when the 4T mode is selected.

An amperage input 252 may allow a user to select a desired output current. A wire feed speed input 254 may allow a user to select a desired wire feed speed of the wire 122. The desired wire feed speed may be a desired steady-state wire feed speed. In some implementations, the inputs 252 and 254 may be combined into an adjustable knob. A user may press the adjustment knob to cycle between the inputs 252 and 254, and then turn the adjustment knob to select a desired value of the current or wire feed speed. The selected desired value may be displayed on a display 250, which may be a super bright red LED display.

A voltage input 262 may allow a user to select a desired output voltage of the welding signal. An inductance input 264 may allow a user to select a desired inductance which, for example, may optimize weld bead characteristics. An arc force input 266 may allow a user to select desired properties of arc force. A down slope input 268 may allow a user to select a down slope time, which is a function of the down ramp rate of the output current. In some implementations, the inputs 262, 264, 266, and 268 may be combined into an adjustable knob. A user may press the adjustment knob to cycle between the inputs 262, 264, 266, and 268, and then turn the adjustment knob to select a desired value of the voltage, inductance, arc force, or down slope. The selected desired value may be displayed on a display 260, which may be a super bright red LED display.

An advanced features input 280 may allow a user to select menus and toggle through various further inputs, which are displayed on the displays 250 and 260. A MIG welding main menu may provide inputs for operation control, pre-flow, spot on/off, spot time, stitch on/off, stitch time, dwell time, run-in percentage, post-flow, burn back time, wire sharp, and/or a setup submenu. The setup submenu may provide inputs for wire feed units, amperage calibration, voltage calibration, wire speed calibration, arc hour display, VRD (on, off or triggered), total weld energy (for heat input computation), and/or factory defaults. A stick welding main menu may provide inputs for operation control, hot start on/off, hot start time, hot start amperage, and/or a setup submenu. The setup submenu may provide inputs for arc hour display, VRD disable, and factory defaults. The TIG main menu may provide inputs for operation control, pre-flow, post-flow, and a setup submenu. The setup submenu may provide inputs for arc hour display, VRD disable, and factory defaults.

Burn back time may refer to an adjustable period of time that the power supply 110 may provide power for the welding process after the wire feed stops in order to burn back the wire and prevent it from sticking in the weld puddle. Wire sharp refers to the application of predefined current outputs applied to the wire, for example, a rapid series of powerful current pulses after the motor 166 is de-energized. This prevents a ball of molten metal from freezing on the end of the welding wire, and tapers the end of the weld wire to a sharp point, promoting a cleaner start when welding resumes. The current outputs terminate when an open-circuit is detected or after a predefined time or condition is reached. Run-in percentage refers to a percent of wire feed speed. The percentage may range, for example, from about 25 percent to about 150 percent of the wire feed speed. The run-in setting may, for example, allow a user to temporarily alter the selected wire feed speed to optimize MIG weld start characteristics.

The control circuit 152 may receive each of the quantities respectively associated with each of the inputs. Further, although the above inputs are shown in particular implementations, each of the inputs may be configured as a dial, adjustment knob, button, or switch, for example. Additionally, in some implementations, some of the inputs may be automatically selected by the control circuit 152. Which inputs are automatically selected and which inputs are user-selectable may depend on which welding process is selected. In some implementations, some parameters, for example wire diameter, material, gas, and joint design, may not be programmed into the control circuit 152.

Figure 3:
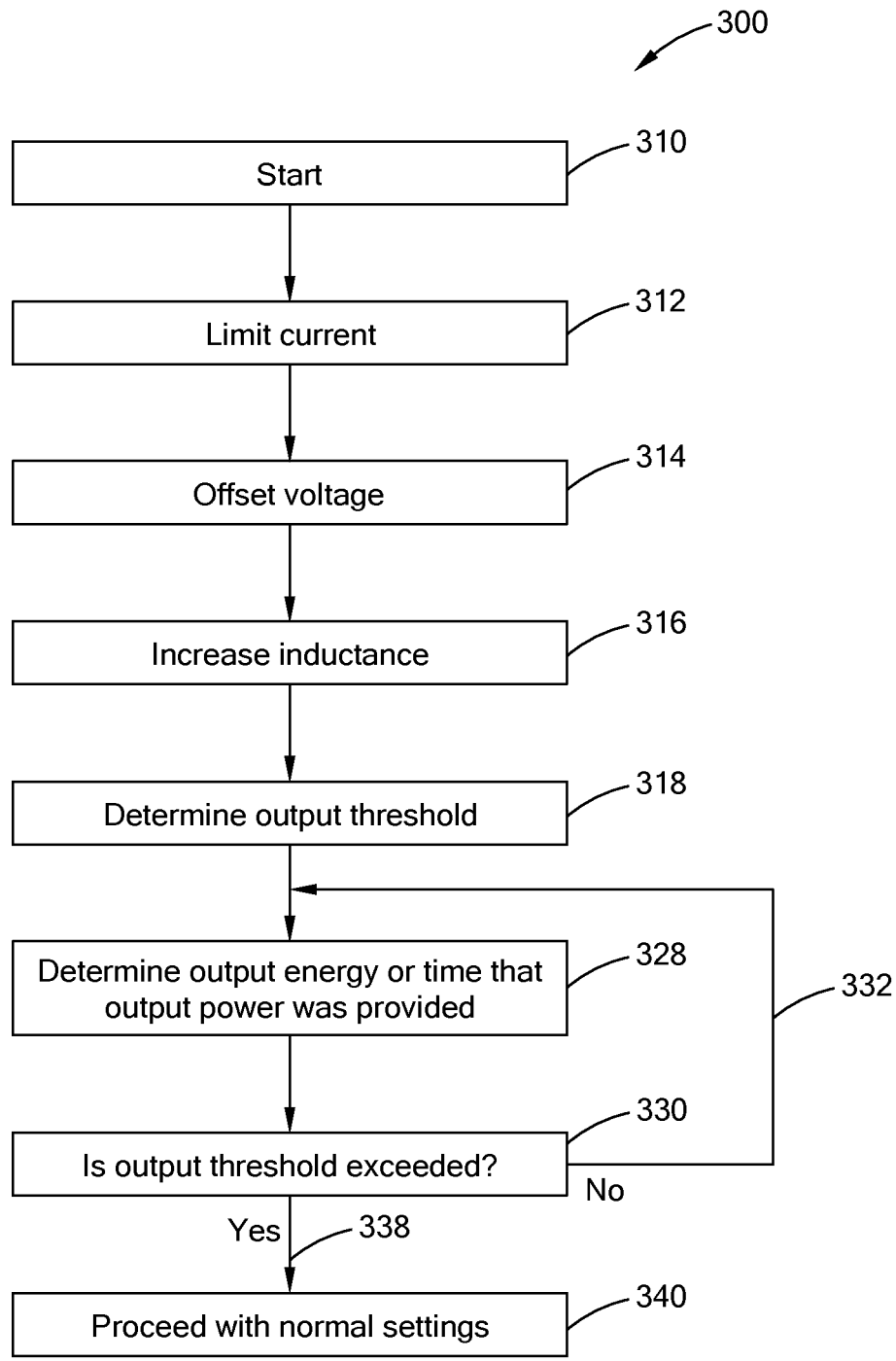
FIG. 3 is a flow chart illustrating a method of controlling output power during startup.

Now referring to FIG. 3, a method 300 for controlling the start up power is provided. The method 300 addresses improved initiation of gas metal arc welding and flux core arc welding by restricting output pending the detection of energy transfer. The method 300 described herein may be configured to prevent repeated, explosive stubbing that can occur during startup. During GMAW and FCAW weld commencement, output parameters such as current are controlled or altered until output energy or sustained output power indicates that the wire and part to be welded are hot enough for operation using optimized steady-state limits.

The ordering of the steps presented herein is merely one implementation of the method 300. Those skilled in the art will recognize that the ordering may be varied, that some steps may occur simultaneously, that some steps may be omitted, and that further steps may be added. Moreover, each step involving the controller may be implemented by configuring (e.g. programming) the controller to perform the step.

The method 300 starts in block 310. In block 312, the current is altered, for example by limiting current to a maximum limit which may be predefined at, for example, 300 amps. Additionally, current may be limited from falling below a minimum threshold which is below the maximum threshold. In block 314, the voltage may be optionally temporarily offset. In block 316, the system may optionally increase the inductance of the weld circuit. In some implementations, electronic inductance is also temporarily increased based on whether a threshold output energy is reached or a sustained output power over a period of time is provided, but is an independent element of the system. The inductance may be changed by changing constants in a proportional-integral loop which may for example be implemented in software. It is understood that all of blocks 312, 314 and 316 may be performed together or in various combinations.

In some other implementations, for stick welding (SMAW) arc force adjustment may be controlled and for TIG some pulse or AC characteristics (e.g. pulse amplitude and duration) may be adjusted. Other parameters used to regulate power delivery could also be altered until, as will be discussed below, an output threshold is passed. The modified limits prevent the wire or other consumable electrode from vaporizing repeatedly before the weld puddle is fully developed. By abbreviating the period before steady-state conditions are established, the weld bead is better formed and undesirable spatter can be reduced near the starting point of the weldment.

In block 318, the control circuit 152 determines an output threshold, which may be either an output energy threshold or a time threshold that output power has been provided. The output threshold may or may not be predefined, and may be based on one or more, or any combination of user selectable welding parameters described herein.

In block 328, the control circuit 152 then continuously determines the output energy or a time that output power has been provided. Software may determine output energy by calculating a time integral of the output power. Instantaneous output power is a product of voltage and current measurements received from electronic feedback sensors. In other implementations, to determine output energy, only a single voltage or current measurement is required, because the software may determine output current from output voltage, or vice versa, by mathematically calculating or using a look-up table corresponding to the formula I=20(V−14V), where I is output current, and V is output voltage, according to IEC 60974-1 (2005) section 11.2.3. Software may also determine a time that output power is provided by determining how long output power has been provided above a threshold. Preferably, the time may be at least 50 milliseconds or may be about 50 milliseconds. In some examples, the time is counted and incremented only when the output power is above an output power threshold. For example, the time threshold is reached when at least a quarter of the power estimated by the IEC 60974-1 (2005) section 11.2.3 guidelines is provided for at least 50 milliseconds or about 50 milliseconds. When the time aggregates 50 milliseconds (which can be nonconsecutive), then the time threshold is reached.

It is contemplated herein that operational amplifiers or other electronic circuits could also be used to integrate the product of voltage and current measurements, and to determine whether a threshold output power has been provided. Additionally, it is contemplated that greater or lesser current and time values could be used. Also, calculations of time threshold or output energy may be based on optical, acoustic or temperature measurements at the part to be welded.

In block 330, the control circuit 152 determines if the output threshold is exceeded. For example, the control circuit 152 determines if the output energy exceeds the output energy threshold, or if the time the output power is provided exceeds the time threshold. If the output threshold is not exceeded, the method follows line 332 to block 328. Referring again to block 330, if the output threshold is exceeded, the method follows line 338 to block 340. In block 340, the welding process proceeds with normal welding settings. For example, the current limit is restored to the steady-state current limit to optimize steady-state weld performance. The steady-state current limit may correspond to 3.75 times the standard IEC current, whereas the current limit used before the threshold is reached may be 1.9 times the standard IEC current, for example. The current limit used before the threshold is reached may be less than about 70%, or less than 60%, or less than about 50% of the steady-state current limit, for example.

Figure 6:
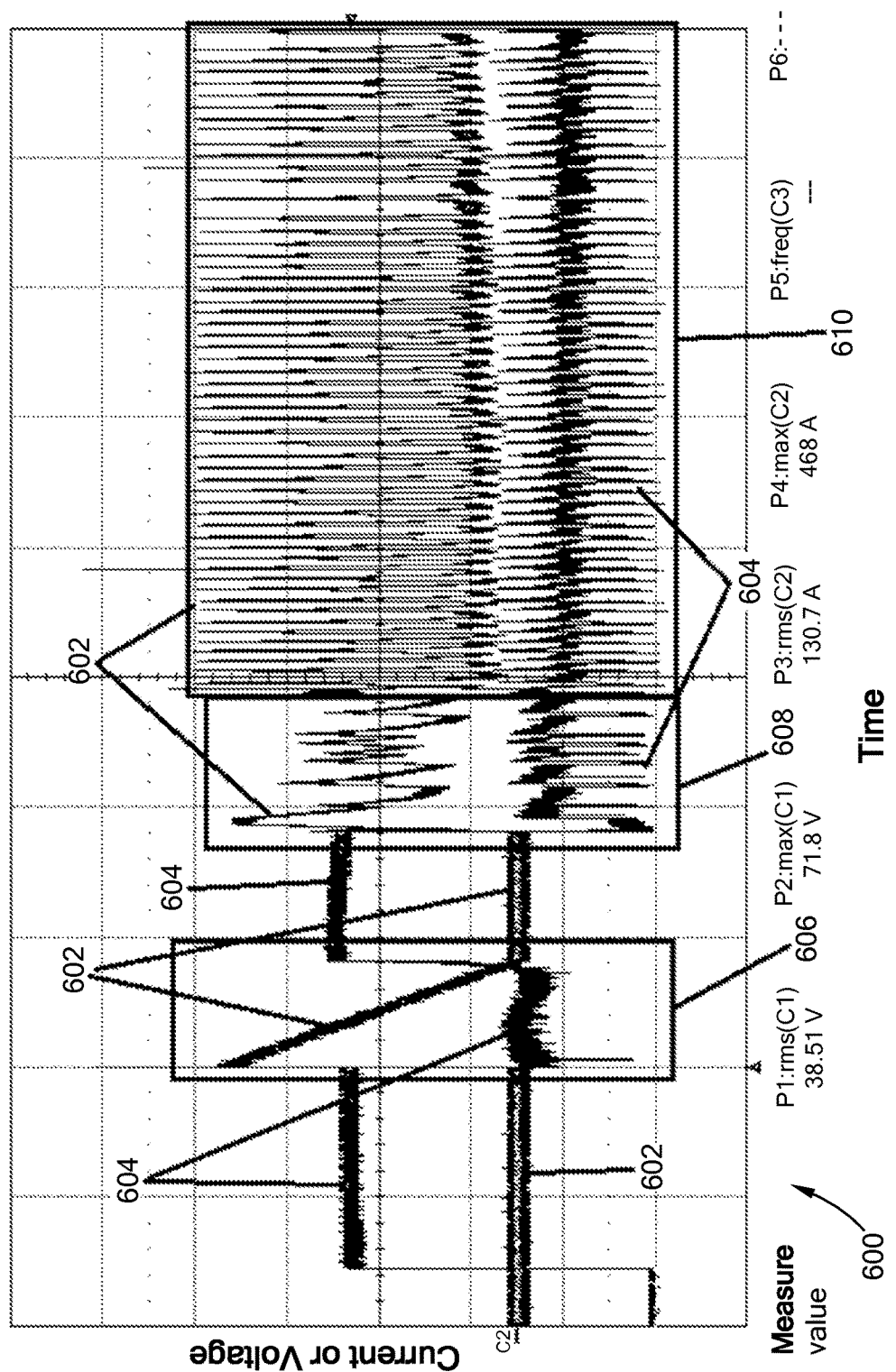
FIG. 6 is a wave form where the method of FIG. 3 has been combined with the method of FIG. 4 or 5.

By reducing current limits, for example the maximum allowable current, before a precomputed output energy or output power is dissipated at the contact point, the wire remains intact as it is heated to the melting point, promoting a rapid, consistent startup characteristic. The increased steady state limits allow brief excursions past the power supply's design capacity for sustained output current, enabling a small power supply to attain performance characteristics previously requiring a more capacious and expensive design. The output of one design implementation is illustrated in FIG. 6.

Figure 4:
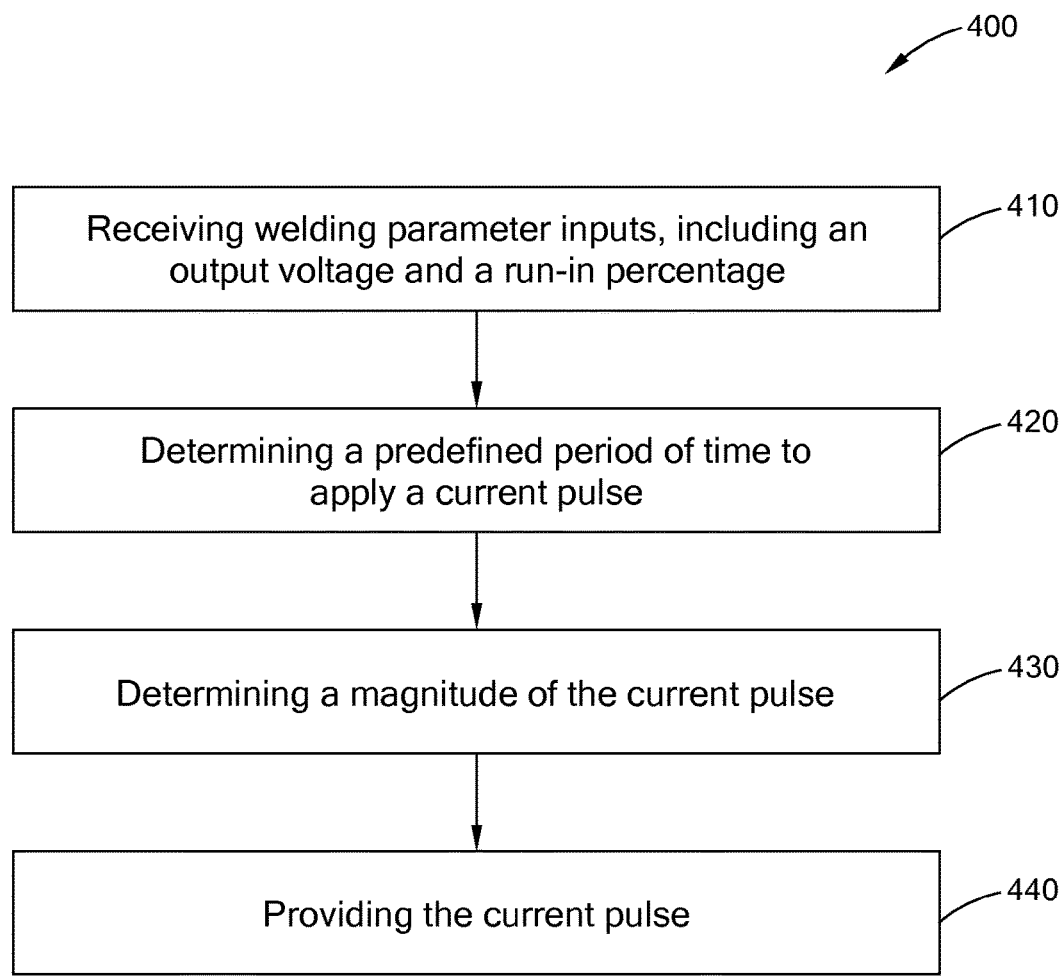
FIG. 4 is a flow chart illustrating a method of expediting process stabilization during weld startup.
Figure 5:
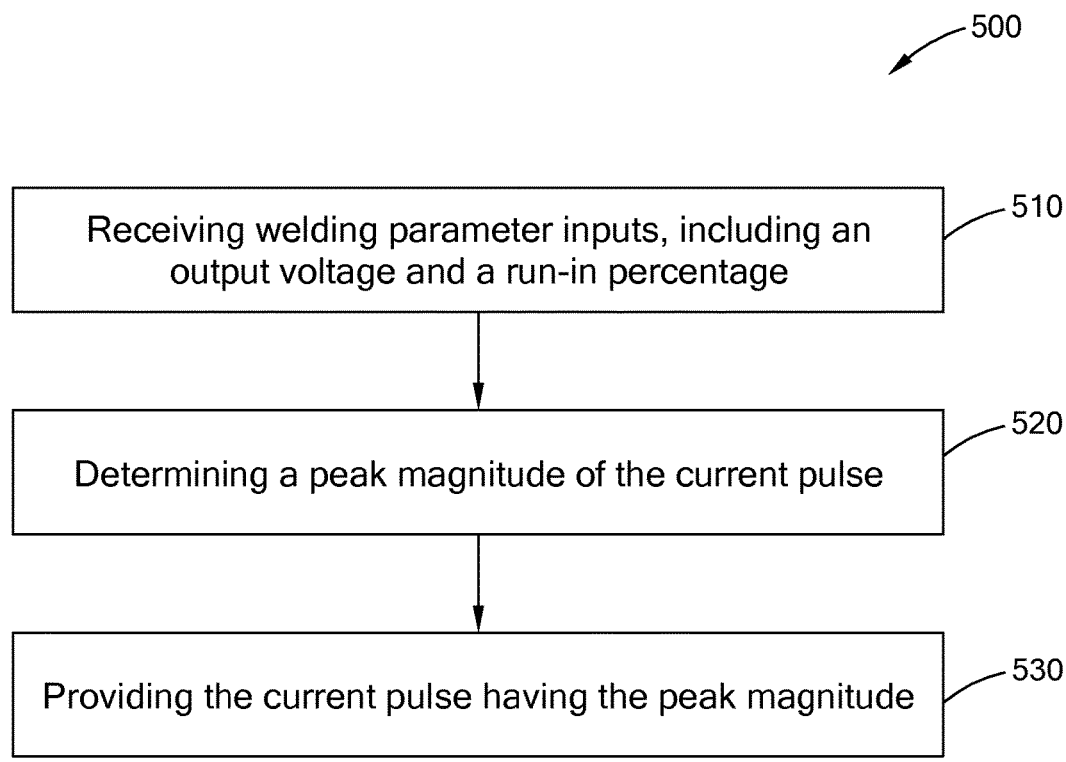
FIG. 5 is a flow chart illustrating another method of expediting process stabilization during weld startup.

Now referring to FIGS. 4 and 5, methods 400 and 500 for expediting process stabilization by providing an improved start is provided. The methods 400 and 500 may each be implemented in gas metal arc welding and flux core arc welding, for example when the MIG welding setting is selected. The orderings of the steps presented herein are merely particular implementations of the methods 400 and 500. Those skilled in the art will recognize that the orderings may be varied, that some steps may occur simultaneously, that some steps may be omitted, and that further steps may be added. Moreover, each step involving the controller may be implemented by configuring (e.g. programming) the controller to perform the step.

The method 400 starts in block 410. In block 410, the control circuit 152 may receive the run-in percentage from the run-percentage input and the output voltage from the voltage input 262. In some implementations, the control circuit may also receive the wire feed speed, inductance, burn-back time, and/or wire sharp setting from their respective inputs. The method 400 may proceed from block 410 to block 420.

In block 420, the control circuit 152 may determine and/or store a predefined period of time for applying a current pulse. The predefined period of time may be based on the run in percentage and/or the output voltage. In some implementations, the predefined period of time may be determined according to the formula A+B*(Run in percentage)+C*(Voltage setting), where A, B, and C may each have any positive or negative values. In a particular implementation, the formula may have the values 33 µs−(47.2 µs)*(Run-in percentage)+(2.11 µs/V)*(Voltage setting). As shown in the equations, the predefined period of time may be a linear function or substantially a linear function of the run in setting and the voltage setting. However, it is understood that various other function could be used including exponential or quadratic relationships. The method 400 may proceed from block 420 to block 430.

In block 430, the control circuit 152 may determine and/or store a magnitude of the current pulse. In some implementations, a magnitude or magnitudes of the current pulse over the predefined period of time may be independent of selected welding parameters. The current pulse may have a maximum magnitude at the start of the predefined period of time and decrease linearly or substantially linearly as a function of time to a magnitude of about zero at the end of the predefined period of time. In other implementations, the magnitude may decrease from a maximum magnitude to a magnitude of about zero according to a nonlinear or substantially nonlinear, decaying exponential or substantially decaying exponential, or parabolic or substantially parabolic functions, or any other mathematical functions.

In some implementations, the maximum magnitude may have a predefined value of between about 250 and about 1000 amps, or between about 400 and 500 amps, and in a particular implementation, about 450 amps. In some implementations, the magnitude of the current pulse may remain constant or substantially constant throughout the predefined period of time. In other implementations, the magnitude profile of the current pulse may be based on the inductance, wire feed speed, burn-back time, wire sharp setting, or combinations thereof. The method 400 may proceed from block 430 to block 440.

In block 440, the control circuit 152 may provide the current pulse at the start of the welding process for the predefined period of time. The control circuit 152 operates in current control mode to control the current pulse according to the abovementioned magnitude profiles.

The method 500 starts in block 510. In block 510, the control circuit 152 may receive the run-in setting from the run-in setting input and the desired output voltage from the voltage input 262. In some implementations, the control circuit may also receive the wire feed speed, inductance, burn-back time, and/or wire sharp setting from their respective inputs. The method 500 may proceed from block 510 to block 520.

In block 520, the control circuit 152 may determine and store a peak magnitude of the current pulse. The current pulse may have a peak magnitude at the start of a period of time and decrease linearly or substantially linearly as a function of time to a magnitude of about zero at the end of the period of time. In other implementations, the magnitude may decrease from a maximum magnitude to a magnitude of about zero according to a nonlinear or substantially nonlinear, decaying exponential or substantially decaying exponential, or parabolic or substantially parabolic functions, or any other mathematical functions. The period of time may be a predefined period of time, for example 82 milliseconds.

The peak magnitude may be determined according to the formula A+B*(Run-in speed)+C*(Voltage setting), where A, B, and C may each have any positive or negative real numbers. In a particular implementation, the formula may have the values 217 amps−(310 amps)*(Run-in speed setting/100%)+(13.9 amps/volts)*(Voltage setting). The run in speed is a setting in percent of the wire feed speed during run in with respect to the welding wire feed speed. For example, if the welding wire feed speed is 500 inches per minute and the run in speed setting was 80% the run in wire speed would be 400 inches per minute. The voltage setting is the desired voltage during welding. As shown in the equations, the peak magnitude may be a linear function or substantially a linear function of the run in setting and the voltage setting. In other implementations, the magnitude of the current pulse may remain constant or substantially constant at the peak magnitude throughout the period of time. The method 500 may proceed from block 520 to block 530.

In block 530, the control circuit 152 may provide the current pulse at the start of the welding process for the predefined period of time. The control circuit 152 operates in current control mode to control the current pulse according to the abovementioned magnitude profiles.

In each of the methods 400 and 500, rather than starting at the maximum magnitude, the current pulse may instead first increase from zero to the maximum magnitude over a period of time, which can be predefined based on user-selected or programmed welding parameters, such as run in percentage, output voltage, inductance, wire feed speed, burn-back time, wire sharp setting, or combinations thereof. The increase may reach the maximum magnitude according to a linear or substantially linear, nonlinear or substantially nonlinear, exponentially increasing or substantially exponentially increasing, logarithmically increasing or substantially logarithmically increasing, or parabolic or substantially parabolic functions, or any other mathematical functions. After the maximum magnitude is reached, the current may drop off in the manner discussed earlier.

In each of the methods 400 and 500, it may intended that in some implementations, the energy provided by the current pulse is predefined. That is, the parameters upon which the current pulse is dependent may be set so that a predefined (e.g. programmed) amount of energy is provided by the current pulse. The energy may be determined by calculating a time integral of the output power. The output power may be determined by multiplying the output voltage and the output current. In other implementations, the energy may not be predefined.

In each of the methods 400 and 500, the current pulse may reduce or largely eliminate periods of initial erratic operation during the initial stages of the welding process due to temperatures of the weldment and filler wire not having yet stabilized. The weld puddle develops and reaches steady-state temperature as the current pulse decreases. The total energy provided by the current pulse may be optimized for sufficient preheating, yet may also be kept low enough such that the extra current does not vaporize the wire. Sufficient preheating provided by the current pulse may thus expedite stabilization of the welding process.

Now referring to FIG. 6, a waveform graph 600 is provided that shows operation of the method 300 of FIG. 3 in conjunction with either the method 400 of FIG. 4 or the method 500 of FIG. 6. The graph 600 includes a current waveform 602 and a voltage waveform 604, each plotted as a function of time at the start of the welding process. The methods may provide particularly desirable characteristics when used in combination with one another and each combination is contemplated herein. For example, the current limiting method 300 may be implemented directly after and in combination with either of the methods 400 or 500, as illustrated in FIG. 6. The time segment 606 of the waveforms 602 and 604 corresponds to the methods of FIG. 4 or 5, the time segment 608 of the waveforms 602 and 604 corresponds to the method of FIG. 3, and the time segment 610 of the waveforms 602 and 604 is a steady-state waveform.

Figure 7:
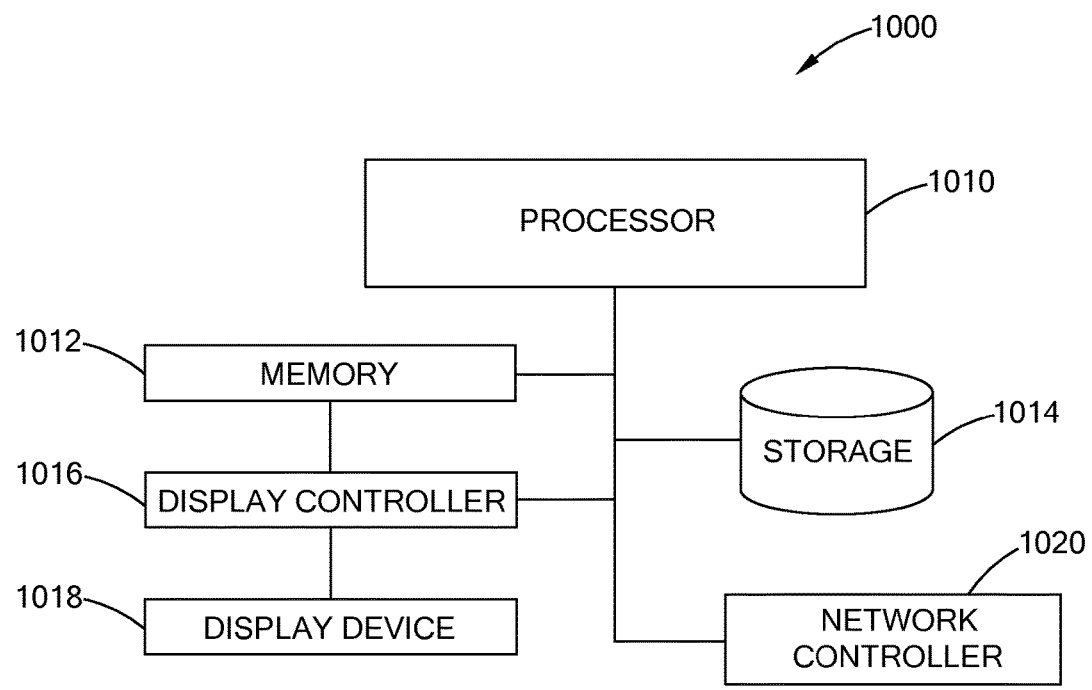
FIG. 7 is a schematic view of a processing system for implementing the methods described herein.

Any of the controllers, control circuits, modules, servers, or engines described may be implemented in one or more computer systems or integrated controllers. One exemplary system is provided in FIG. 7. The computer system 1000 includes a processor 1010 for executing instructions such as those described in the methods discussed above. The instructions may be stored in a computer readable medium such as memory 1012 or storage devices 1014, for example a disk drive, CD, or DVD, or in some form of nonvolatile memory, internal or external to the processor, such as EPROM or flash. The computer may include a display controller 1016 responsive to instructions to generate a textual or graphical display on a display device 1018, for example a computer monitor. In addition, the processor 1010 may communicate with a network controller 1020 to communicate data or instructions to other systems, for example other general computer systems. The network controller 1020 may communicate over Ethernet or other known protocols to distribute processing or provide remote access to information over a variety of network topologies, including local area networks, wide area networks, the Internet, or other commonly used network topologies.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system or processor. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

What is claimed is:
1. A method for generating a weld during a start of a welding process, the method comprising:
 initially generating a welding output power by a control circuit, wherein the control circuit is configured to simultaneously limit a current and increase an inductance from an initial start of the welding process;

continuously determining a welding energy output or a first period of time that the welding output power is provided;

determining a second period of time for providing a current pulse, the second period of time is based on a run-in percentage of a wire feed speed and an output voltage, and a magnitude of the current pulse varies during the second period of time; and providing a normal welding parameter after either: the welding energy output exceeds an energy output threshold, or the first period of time exceeds a time threshold.

2. The method of claim 1, wherein the control circuit is configured to simultaneously offset a voltage while limiting the current and increasing the inductance from the initial start of the welding process.

3. The method of claim 1, further comprising:
calculating the welding output power based on a measured current and a measured voltage; and
determining the welding energy output by calculating a time integral of the welding output power.

4. The method of claim 1, wherein the control circuit continuously determines the welding output power if the welding output power does not exceed the energy output threshold.

5. The method of claim 1, wherein the control circuit continuously determines the welding output power if the first period of time has not exceeded the time threshold.

6. The method of claim 1, wherein the energy output threshold is predefined.

7. A method for expediting process stabilization during weld startup, the method comprising:
receiving, at a control circuit, welding parameter inputs, the welding parameter inputs including a run-in percentage of a wire feed speed from a run-percentage input, and an output voltage from a voltage input;
determining, by the control circuit, a predefined period of time to apply a current pulse, the predefined period of time is based on the run-in percentage and the output voltage;
determining, by the control circuit, a magnitude of the current pulse; and
providing, by the control circuit, the current pulse for the predefined period of time.

8. The method of claim 7, wherein the welding parameter inputs further comprises:
the wire feed speed;
an inductance;
a burn-back time; or
a wire sharp setting.

9. The method of claim 7, wherein the magnitude of the current pulse is independent of the welding parameter inputs.

10. The method of claim 7, wherein the current pulse includes a maximum magnitude at a start of the predefined period of time and decreases linearly as a function of time to a magnitude of zero at an end of the predefined period of time.

11. The method of claim 7, wherein the current pulse includes a maximum magnitude at a start of the predefined period of time and decreases nonlinearly to a magnitude of zero at an end of the predefined period of time.

12. A method for expediting process stabilization during weld startup, the method comprising:
receiving, at a control circuit, welding parameter inputs, the welding parameter inputs including a run-in percentage of a wire feed speed from a run-percentage input, and an output voltage from a voltage input;
determining, by the control circuit, a peak magnitude of a current pulse, the peak magnitude occurring at a start of a predefined period of time, the predefined period of time is based on the run-in percentage and the output voltage; and
providing, by the control circuit, the current pulse having the peak magnitude.

13. The method of claim 12, wherein the welding parameter inputs further comprises:
the wire feed speed;
an inductance;
a burn-back time; or
a wire sharp setting.

14. The method of claim 12, wherein the peak magnitude of the current pulse remains constant throughout the predefined period of time.

15. The method of claim 12, wherein the peak magnitude of the current pulse decreases linearly as a function of time to a magnitude of zero at an end of the predefined period of time.

16. The method of claim 12, wherein the peak magnitude of the current pulse decreases nonlinearly to a magnitude of zero at an end of the predefined period of time.

17. The method of claim 1, wherein the magnitude of the current pulse has a maximum magnitude at a start of the second period of time and decreases to a value of approximately zero at an end of the second period of time.

18. The method of claim 17, wherein the magnitude of the current pulse decreases linearly.

19. The method of claim 17, wherein the magnitude of the current pulse decreases nonlinearly.

20. The method of claim 1, wherein the control circuit limits the current until the welding energy output exceeds the energy output threshold.

* * * * *